May 6, 1941.　　　C. W. YELM ET AL　　　2,240,736
SELF-TURNING ROUND BELT
Filed March 25, 1940

CHARLES W. YELM and
ANTONE F. REZNICEK
INVENTORS

BY Martin E. Anderson
ATTORNEY.

Patented May 6, 1941

2,240,736

UNITED STATES PATENT OFFICE 2,240,736

SELF-TURNING ROUND BELT

Charles W. Yelm and Antone F. Reznicek, Denver, Colo., assignors to The Gates Rubber Company, Denver, Colo., a corporation of Colorado Application March 25, 1940, Serial No. 325,776

6 Claims. (Cl. 74—238)

This invention relates to improvements in round, endless belts and has reference more particularly to a construction that provides a belt that will automatically rotate in a grooved pulley during operation.

Round belts have been used in connection with grooved pulleys and it has been found that where round belts are employed in connection with pulleys having V-shaped grooves in which the belt does not bottom, the sides will soon flatten where they come in contact with the sides of the groove and the strains and wear will therefore not be distributed equally over the different elements of the belt.

In application Serial No. 320,568, filed February 24, 1940, a belt construction has been described and claimed in which an automatic rotation of a round belt is obtained by arranging the outer covering of bias cut rubberized fabric in such a way that the warp and the woof make unequal angles with the axis of the belt.

It is the object of this invention to produce a self-rotating round belt of such a construction that the outer covering may be made from rubberized fabric cut at a forty-five degree angle and in which the torque forces for effecting a rotation are obtained by incorporating in the core of the belt or between the core and the covering, helically extending cords that tend to straighten when the belt is put under tension and which therefore distort the belt angularly with the result that automatic rotation with equal distribution of strain and wear is effected.

In order to describe this invention so that the construction of the belt can be readily understood, reference will be had to the accompanying drawing in which the construction of the belt has been illustrated, and in which.

Figure 1:
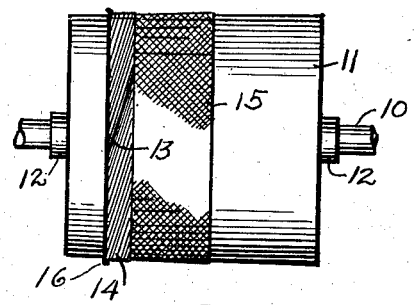
Figure 1 is a top plan view of a cylinder showing the belt material in place thereon, the material forming the core of the belt being so cut that the cords extend diagonally with respect to a transverse plane.

In the drawing reference numeral 10 designates an axle on which a frusto-conical or substantially cylindrical member 11 is mounted. Collars 12 hold member 11 in place. The member 11 is slightly tapering and increases in diameter from left to right as shown in the drawing, but in order to facilitate the explanation it will be referred to as a cylinder.

Figure 3:
Figure 3 is a view showing a strip or cord fabric like that employed in Figure 1, as it appears after it has been cut.

In constructing a belt in accordance with the method shown in Figure 1, a strip of cord fabric is cut diagonally so as to produce a long strip somewhat of the shape shown in Figure 3. The ends which have been designated by reference numeral 13, may be referred to as the selvage edges of the cord fabric. When such a strip is wrapped around the cylindrical surface 11 and cut to the right length, the two ends 13 will join along the line indicated by the same numeral in Figure 1. It will be observed that the cords 14 of which the strip is composed extend diagonally with respect to a plane perpendicular to the axle 10. The extent of the inclination will, of course, depend on the effect desired and the exact angle shown in the drawing is not to be considered as a limitation but merely as illustrative. After the cord fabric has been wrapped around a cylinder, or before, a strip 15 of rubberized fabric is also wound around the cylinder, the edges of the cord strip and the fabric strip preferably overlap slightly so as to facilitate the rolling. After the two elements have been assembled as shown, a strong cord 16 is positioned along the lefthand edge of the core strip and this forms the center of the belt and also facilitates the rolling operation. The belt is formed by rolling the material from left to right and therefore in the finished belt the core and the covering form spirals when viewed in transverse section. There is nothing novel in the particular method employed in making the belt and the only novelty in connection with the belt illustrated in Figure 1 consists in the diagonal arrangement of the cords which form the core.

Figure 2:
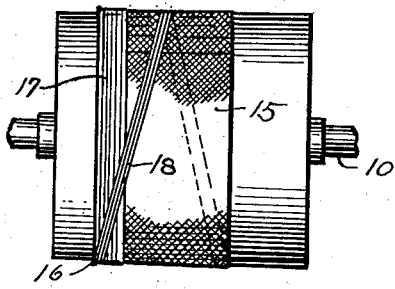
Figure 2 is a view similar to that shown in Figure 1, but which shows the cord fabric forming the core lying in a plane perpendicular to the axis of the cylinder and in addition to the cord fabric and the woven fabric, a strip of cord fabric is wound helically around the cylinder in the manner indicated.

In Figure 2 a slightly modified form has been shown. In this construction the rubberized fabric strip 15 is cut at a forty-five degree angle and the core 17 is formed from a strip of cord fabric in which the cords are parallel to a plane perpendicular to the axis of the cylinder. In order to make a belt having straight cord cores and rubberized fabric cut at a forty-five degree bias rotate, it is necessary to embody cords extending helically and in Figure 2 a cord strip 18 has been shown which makes one or more complete revolutions of the cylinder. Strip 18 may be formed from ordinary cord fabric and may be two or three cords in width. Of course, a greater width may be used if found desirable. When the belt shown in Figure 2 is rolled, the cords of strip 18 will form a helically extending band, which will give the necessary torque reaction when the belt is subjected to tension.

Figure 4:
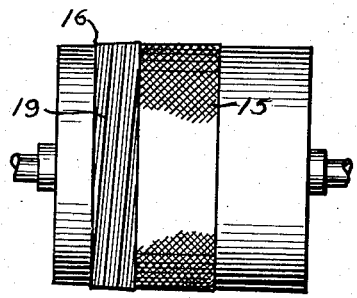
Figure 4 is a view similar to those shown in Figures 1 and 2, but shows a slightly modified construction in which the cord fabric comprising the core portion is wound helically around the cylinder.
Figure 5:
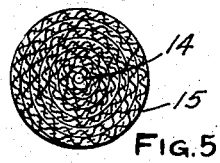
Figure 5 is a section of a belt constructed in accordance with the method illustrated in Figure 1.
Figure 6:
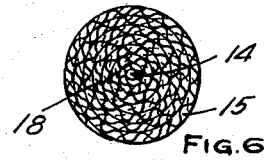
Figure 6 is a section showing a belt constructed in accordance with the method shown in Figure 2.
Figure 7:
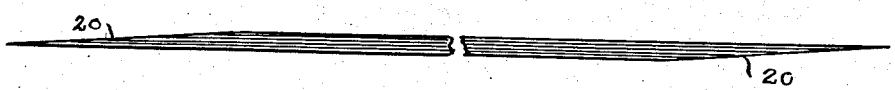
Figure 7 is a drawing showing the appearance of the cord strip employed in the method illustrated in Figure 4.

In Figure 4 a slightly different form of construction has been employed. In this construction the cord fabric is cut into strips extending parallel with the cords and the ends tapered in the manner shown in Figure 7. The strip may be three or four cords in width and such a strip is then wound helically about the cylinder, as shown in Figure 4, where the heavy lines 19 designate the edges of adjacent convolutions. The ends are tapered along lines 20 so that the several turns will form a strip of uniform width. The core overlaps the adjacent edge of the bias cut fabric 15. The usual cord center 16 is applied and the material is then rolled from left to right whereupon a round belt is produced.

After the belt has been constructed in accordance with either of the three specifically different methods shown, it is vulcanized in the ordinary way.

Figure 8:
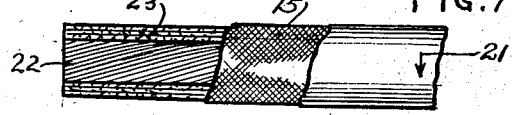
Figure 8 is a view of a belt showing parts thereof broken away to better disclose the construction.

When such a belt is operatively associated with pulleys for the purpose of transmitting power, it will stretch slightly, due to the elasticity of the material employed, and during such stretching the helical arrangement of the cords of the core, or of the cords of strip 18 produces a torque that tends to turn the belt in the manner shown in Figure 8 and designated by arrow 21. In Figure 8, the core has been designated by reference numeral 22 and the outside covering by reference numeral 23. The outer layer of the covering has been removed for a portion of the distance so as to better show the forty-five degree relationship between the warp and the woof.

There may be other ways of obtaining the rotary forces desired and the three specifically different methods described and shown are illustrative only.

Tests have shown that belts constructed in accordance with either of the methods above described will continue to rotate while transmitting power as long as they remain elastic. If the strains imposed are so strong that the material is stretched beyond its elastic limit, the action will not be so marked, but it is not customary to operate belts under such conditions.

Having described the invention what is claimed as new is:

1. A round self-turning belt, comprising a core of substantially parallel cords, a covering of fabric, and means comprising cords extending helically around the axis of the belt in the same direction, to produce a torque action when the belt is subjected to tension.

2. A round self-turning belt comprising a core of parallel cords extending helically about the axis of the belt, and an outer layer of bias cut rubberized woven fabric surrounding the core, the warp and the woof making equal angles with the axis of the belt.

3. A round self-turning belt, comprising a core formed from a plurality of substantially parallel cords extending helically about the axis of the belt, and an outer layer of rubberized woven fabric cut on a bias of substantially forty-five degrees, the warp and the woof making equal angles with the axis of the finished belt.

4. A round self-turning belt comprising a core formed from a strip of cord fabric whose length is parallel with the cords, the cords in the strip extending the entire length of the belt, a strip of cord fabric extending helically around the core, and a covering of bias cut rubberized fabric surrounding the core and helically wound cords, the warp and the woof making equal angles with the axis of the finished belt.

5. A round self-turning belt having a core formed from a strip of cord fabric having cords whose lengths are at least twice the length of the finished belt and which extend helically about the axis of the finished belt, and a bias cut rubberized woven fabric extending spirally about the core, the warp and the woof making equal angles with the axis of the belt.

6. A round self-turning belt comprising a central core formed from a plurality of parallel fabric cords embedded in rubber, an outer covering comprising a bias cut rubberized woven fabric extending spirally about the core, and means for producing a torque when the belt is tensioned, said means comprising a plurality of cords embedded in the belt between the core and the covering and extending helically about the axis thereof.

CHARLES W. YELM.
ANTONE F. REZNICEK.